United States Patent [19]

Rosenblatt

[11] 4,289,064

[45] Sep. 15, 1981

[54] AUTOMATED COOKER

[76] Inventor: Stephen L. Rosenblatt, 2500 Haven La., Salt Lake City, Utah 84117

[21] Appl. No.: 171,637

[22] Filed: Jul. 24, 1980

Related U.S. Application Data

[63] Continuation-in-part of Ser. No. 34,219, Apr. 30, 1979, abandoned.

[51] Int. Cl.$^3$ .............................................. A47J 37/04
[52] U.S. Cl. ...................................... 99/334; 99/326; 99/355; 99/386; 99/392; 99/402; 99/427; 99/443 C; 198/685; 198/857; 431/54
[58] Field of Search ................. 99/373, 386, 389, 391, 99/392, 393, 326, 355, 402, 427, 443 C, 334; 198/473, 857, 685; 431/54

[56] References Cited

U.S. PATENT DOCUMENTS

| | | | |
|---|---|---|---|
| 2,151,401 | 3/1939 | Belcher | 99/334 |
| 2,259,073 | 10/1941 | McGlaughlin | 99/386 |
| 2,689,517 | 9/1954 | Angelus | 99/386 |
| 2,718,188 | 9/1955 | Read et al. | 99/402 |
| 2,728,286 | 12/1955 | Ehrenberg | 99/386 |
| 2,907,267 | 10/1959 | Lindsey | 99/402 |
| 2,946,376 | 7/1960 | Thornberry et al. | 431/54 X |
| 3,019,744 | 2/1962 | Carvel | 99/402 |
| 3,525,300 | 8/1970 | Genetti | 99/392 X |
| 3,664,257 | 5/1972 | Meyer | 99/402 X |
| 3,691,935 | 9/1972 | Spetz | 99/402 X |
| 3,734,740 | 5/1973 | Zenos | 99/355 X |
| 3,850,280 | 11/1974 | Ohrnell | 198/685 |

Primary Examiner—Billy J. Wilhite
Attorney, Agent, or Firm—H. Ross Workman; Rick D. Nydegger; Drew S. Hamilton

[57] ABSTRACT

An automated cooker for sandwiches and the like. The automated cooker includes a pair of heating elements spaced one from the other so as to provide passage therebetween. A motor drives a conveyor which carries a plurality of individual sandwich holders through the passage between the heating elements. Each sandwich holder consists of a handle which can be attached to the conveyor and a top portion which encloses the sandwich to be cooked. A bar is placed below the heating elements and extends along the length of the cooker. The bar is used to trigger a switch which activates the heating elements and which turns on a motor that drives the conveyor. The bar may be activated by the handle of any sandwich holder placed on the conveyor. The bar is deactivated so as to turn off the heating elements and the motor which drives the conveyor when the handle of the last sandwich holder reaches a notch placed in the end of the bar. A rack provided at the end of the sandwich cooker catches each sandwich holder as it emerges from the passage between the heating elements. The rack stacks the sandwich holders in sequence as they emerge from the sandwich cooker. Controls are provided for adjusting the temperature of the heating elements and for adjusting the speed of the motor which drives the conveyor.

20 Claims, 12 Drawing Figures

AUTOMATED COOKER

BACKGROUND

This application is a continuation-in-part of my copending application U.S. Ser. No. 034,219 filed on Apr. 30, 1979, now abandoned.

1. Field of the Invention

The present invention relates to automated cookers for hamburgers, sandwiches or the like.

2. The Prior Art

With the advent of fast food chains, many different types of methods and apparatus have been devised for cooking hamburgers or grilling sandwiches and the like. The most common of these consists of a large grill on which the hamburgers or sandwiches are cooked. With this type of sandwich grill, as with most other types, someone must constantly be present to make sure that the hamburgers or sandwiches are properly cooked and are not overdone or under done. Moreover, someone must be present to remove each hamburger or sandwich as it is finished, making sure at the same time that the removed sandwiches correspond to the orders placed by one or more customers.

What is needed in the art is an automated sandwich cooker which will eliminate the need to have someone constantly observe the sandwich while it is cooking and which may be quickly adjusted so as to vary the temperature and/or speed at which any given type of sandwich is to be cooked. It would also be an advancement in the art to provide an automated sandwich cooker that utilizes a sandwich holder for each individual sandwich and that automatically stacks each holder in sequence as they are removed from the cooker.

BRIEF SUMMARY AND OBJECTS OF THE INVENTION

The automated cooker of the present invention includes a pair of heating elements spaced one from the other so as to provide a passage therebetween. A motor drives a conveyor which carries a plurality of individual sandwich holders through the passage between the heating elements. Each sandwich holder consists of a handle which can be attached to the conveyor and a top portion which encloses the sandwich to be cooked. A bar is placed below the heating element and extends along the length of the cooker. The bar is used to activate the heating elements and to trigger a switch which turns on the motor that drives the conveyor. The bar will be automatically activated by the handle of any sandwich holder placed on the conveyor. The bar is de-activated so as to turn off the motor when the handle of the last sandwich holder reaches a notch placed in the end of the bar. A rack provided at the end of the sandwich cooker catches and stacks each sandwich holder as it emerges from the passage between the heating elements. Controls are provided for adjusting the temperature of the heating elements and for adjusting the speed of the motor which drives the conveyor.

It is therefore a primary object of the present invention to provide an improved automated sandwich cooker.

Another important object of the present invention is to provide an automated sandwich cooker that is adjustable so that each sandwich may be individually cooked for a selected period of time and at a selected temperature.

Another important object of the present invention is to provide a sandwich cooker that can be automatically placed into operation whenever a sandwich holder is placed in the cooker.

Yet a further object of the present invention is to provide a sandwich cooker that will automatically catch and stack each individual sandwich holder in sequence as it emerges from the cooker.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawing wherein like parts are designated with like numerals throughout.

Figure 1:
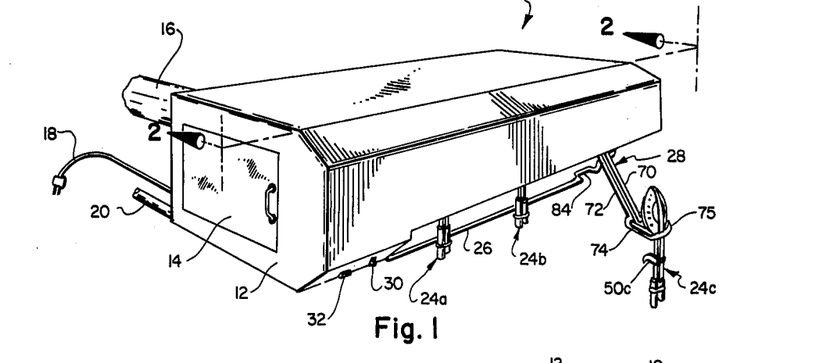
FIG. 1 is a perspective illustration of one presently preferred embodiment of the sandwich cooker of the present invention.

FIG. 1 schematically illustrates the automated sandwich cooker generally designated 10. The cooker 10 consists of a housing 12 which contains the heating elements and controls (described in more detail below). Housing 12 may be constructed from bushed stainless steel or any other suitable type of material that is attractive, easy to clean and long lasting.

Figure 6:
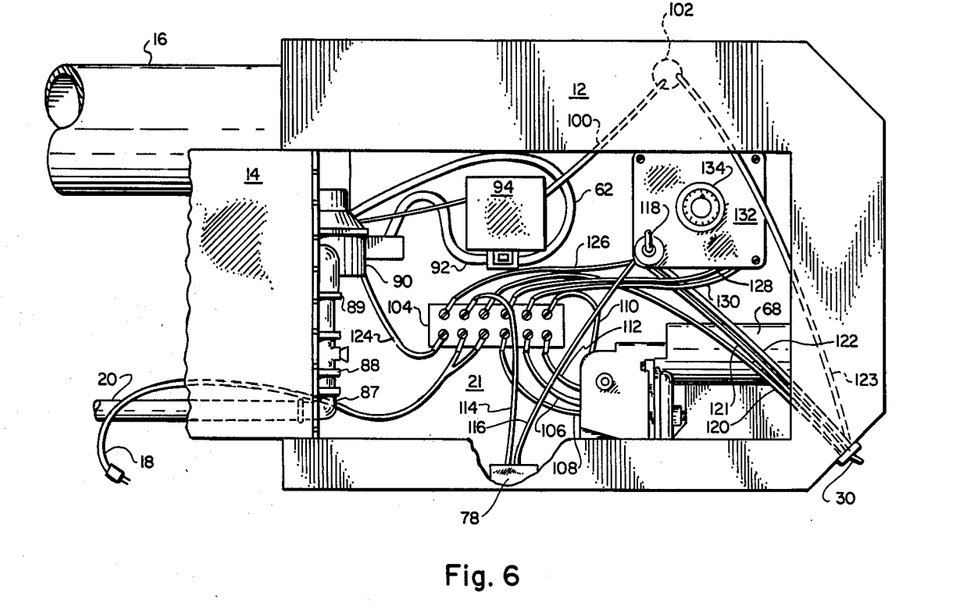
FIG. 6 is a side elevational view of the automated cooker of FIG. 1 illustrating the controls for the cooker.

One end of the housing 12 is provided with a door 14 to a cabinet 21 (see FIGS. 1 and 6). Cabinet 21 houses the controls for the automated cooker 10. An exhaust flue 16 is provided at the rear of cooker 10. Exhaust flue 16 connects to hood 67 (see FIG. 2) and vents the products of combustion to the outside of the building or room in which the cooker 10 is located. A power cord 18 is also provided at the rear of cooker 10. Cord 18 may be plugged into any conventional 120 volt AC outlet. An inlet pipe 20 is designed to be attached to a conventional source of fuel supply such as natural gas.

As further illustrated in FIG. 1, a plurality of individual sandwich holders generally designated 24a-24c are provided in conjunction with the sandwich cooker 10. As shown best in FIG. 7, each sandwich holder consists of two saucer-like plates 34 and 36 which are made from any suitable type of heat conductive metal. Alternatively, plates 34 and 36 may be constructed as wire mesh baskets 34' and 36' (see FIG. 7a) and each sandwich may be wrapped in tin foil and then placed between the wire mesh baskets 34' and 36', as described below.

Figure 7:
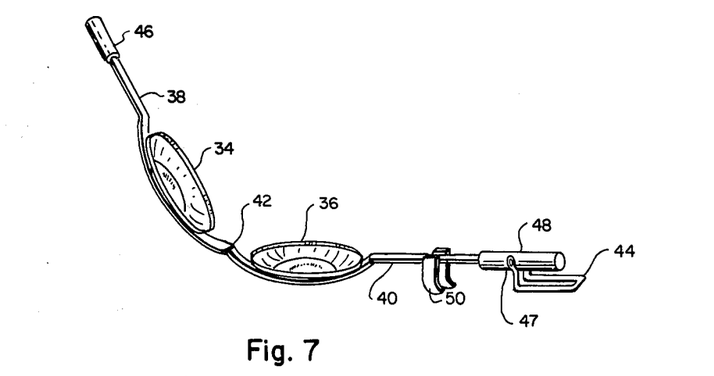
FIG. 7 is a perspective illustration showing an individual sandwich holder that may be used in conjunction with the automated sandwich cooker of the present invention.
Figure 7A:
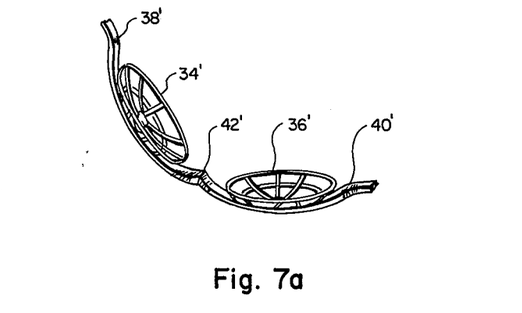
FIG. 7a is a perspective view of another sandwich holder that may be used with the automated sandwich cooker of the present invention.

Plates 34 and 36 are attached respectively to metal rods 38 and 40. Metal rods 38 and 40 are hingedly joined as at 42. Thus, each sandwich holder can individually enclose the hamburger or sandwich to be cooked by clamping the plates 34 and 36 together. Once the plates 34 and 36 are clamped together, the sandwich holder is locked in the clamped position by a compression clip 44 that is hingedly mounted at pin 47 to handle 48. Each sandwich holder is also provided with a hook 50. The hook 50 is located such that the center of gravity of the sandwich holder will be located below hook 50 near the handle 48, for reasons hereinafter more fully described.

With continued reference to FIG. 1, it will be seen that each sandwich holder 24a-24c is individually transported through the cooker 10. For example, sandwich holders 24a and 24b are shown as being in the beginning and intermediate stages of the cooking process, while sandwich holder 24c has emerged from the cooker 10 indicating that the sandwich contained therein has been cooked. As further described below, a rack generally designated 28 catches each sandwich holder once it reaches the end of the cooker 10 and emerges therefrom.

As further illustrated in FIG. 1, a switch 30 is provided on the exterior of cooker 10 so that it may be manually turned on or off. Panel light 32 visually indicates when the cooker is turned on.

Figure 2:
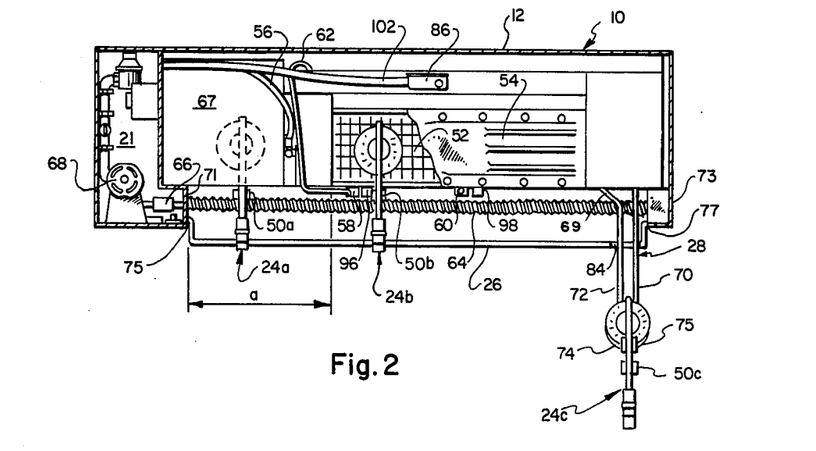
FIG. 2 is a cross section taken along line 2—2 of FIG. 1.

Portions of the interior structure of cooker 10 are illustrated in FIG. 2. As shown in FIG. 2, cooker 10 contains two heating elements 52 and 54. A portion of heating element 54 has been partially broken away in the illustration of FIG. 2 in order to more clearly show the other heating element 52. Heating elements 52 and 54 are spaced one from the other in order to provide a passage therebetween. As described further below, as each sandwich holder 22-24 is transported through the passage formed between heating elements 52 and 54, the heat conductive plates 34 and 36 are heated so as to cook the sandwich that is contained therein.

In the illustrated embodiment, heating elements 52 and 54 are gas burners. A main gas line 56 conducts the fuel to each of the heating elements 52 and 54. Pilot lights 58 and 60 ignite the gas that is conducted to the heating elements 52 and 54. Gas line 62 provides the fuel used for the pilot lights 58 and 60.

Figure 11:
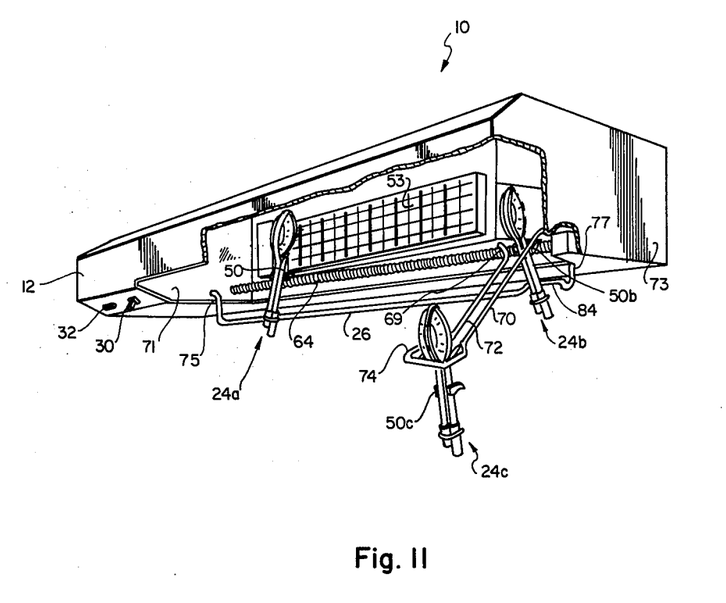
FIG. 11 is a perspective illustration of the sandwich cooker of FIG. 1, with a portion of the exterior housing broken away so as to illustrate the use of electrical grid type heating elements in the cooker.

Although in the illustrated embodiment heating elements 52 and 54 are shown as consisting of gas burners, it will of course be readily apparent to those of ordinary skill in the art that heating elements 52 and 54 could also consist of electrical grid type heating elements 53, as illustrated in FIG. 11. Clearly, a variety of types of heating elements could be used in accordance with the teachings of the present invention.

As further illustrated in FIG. 2, a conveyor 64 is used to transport the sandwich holders 24a-24c through the passage provided between heating elements 52 and 54. As shown in FIG. 2, conveyor 64 consists of a long screw that is supported at both ends by bushings (not shown) in the housing 12. As more fully described hereinafter, each sandwich holder 24a-24c may be placed on the screw conveyor 64 simply by attaching the hook 50 (see FIG. 7) to the threads of the screw.

Screw conveyor 64 is coupled at one end to shaft 66 of motor 68. Motor 68 may be, for example, a 1/15 horsepower AC/DC right angle gear motor operated off a conventional 120 volt outlet. Other suitable types of motors could also be used to rotate the screw conveyor 64. Although in the illustrated embodiment conveyor 64 has been shown as a long screw, it will be appreciated that conveyor 64 could just as well consist of a belt and pulley system or a chain. Moreover, the cooker 10 could be adapted to utilize two or more screw conveyors simply by increasing the number of heating elements or by increasing the space provided between the heating elements.

As screw conveyor 64 is rotated, each sandwich holder 24a-24c is transported into the passage between heating elements 52 and 54. As each sandwich holder 24a-24c passes between the heating elements 52 and 54, as for example sandwich holder 24b, the sandwich contained therein is cooked. Then, after each sandwich holder emerges from the passage between heating elements 52 and 54, it is transported by the screw conveyor 64 to a rack 28 where it is caught and stacked in sequence, as hereinafter more fully described.

Figure 3:
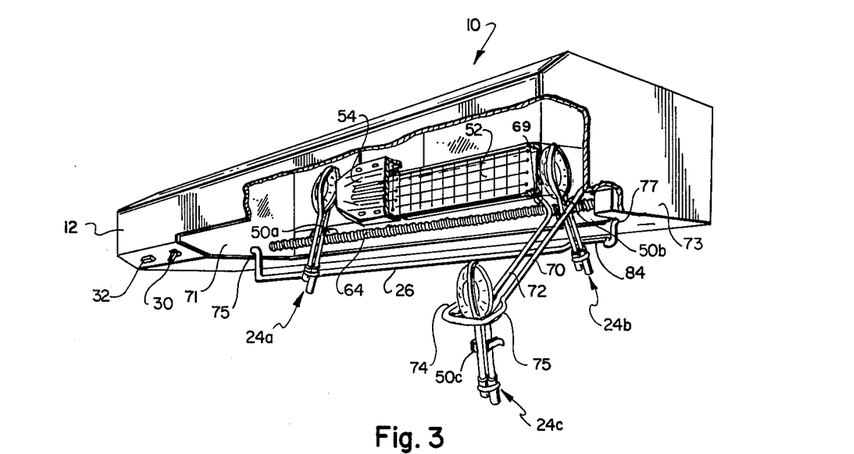
FIG. 3 is a perspective illustration of the sandwich cooker of FIG. 1 with a portion of the exterior housing broken away.
Figure 4:
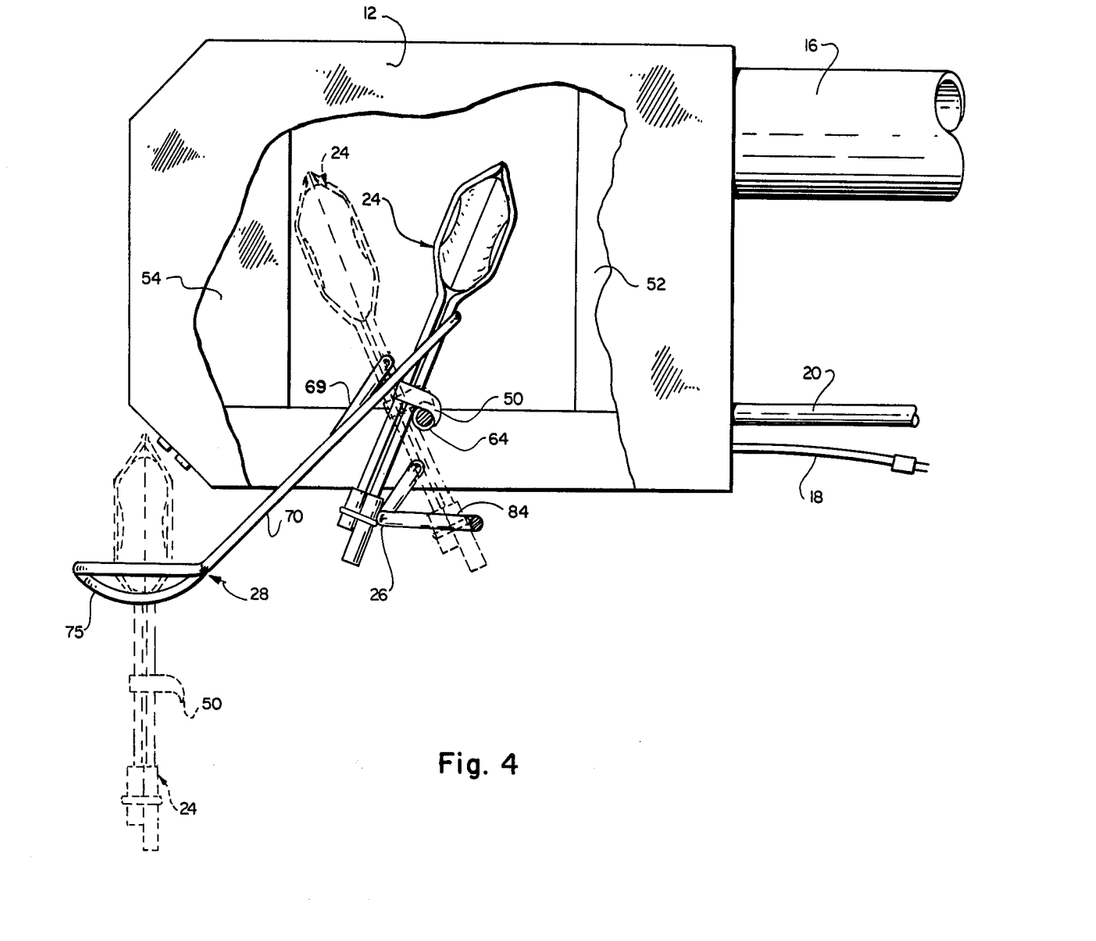
FIG. 4 is a side elevational view with portions broken away to reveal interior construction.

Rack 28 consists of two bars 70 and 72 through which the rod and handle portions of the sandwich holders slide. Connected to the ends of bars 70 and 72 are bars 74 and 75 which form a generally cup-shaped basket for catching and stacking the sandwich holders exiting from the sandwich cooker. As shown in FIGS. 3 and 4, bar 70 extends upwardly and over the screw conveyor 64 so as to impede the progress of the sandwich holders along conveyor 64. Bar 70 is welded or otherwise rigidly mounted to wall 73. Bar 72 is shorter than bar 70 and is bent at its upper end 69 such that the end 69 of bar 72 will not block (see FIG. 4) the movement of the sandwich holders along conveyor 64. Thus, as hereinafter more fully described, each sandwich holder 24a-24c advances along screw conveyor 64 until it is caught by bar 70 of rack 28. Thereafter the sandwich holders slide down rack 28 between bars 70 and 72, and are stacked in the cup-shaped basket formed at the end on rack 28.

With reference to FIGS. 2-4, it will be seen that a handlebar 26 is placed below screw conveyor 64 and extends along the entire length of the screw conveyor 64. Handlebar 26 is pivotally mounted at its ends 75 and 77 to housing walls 71 and 73, and is placed in relation to screw conveyor 64 such that, when a sandwich holder, such as holder 26a, is placed on screw conveyor 64 (see FIGS. 2 and 3), the handle portion 48 will rotate downwardly, contacting the handlebar 26 and displacing it from a rest position to an operating position. Since the center of gravity of each sandwich holder 24a-24c is below the hook 50a-50c, each sandwich holder 24a-24c will tend to rotate about the screw conveyor 64. However, since the handlebar 26 is located below and to the front of screw conveyor 64 (see FIG. 4), the lower handle portion of each sandwich holder will engage the handlebar 26 along substantially its entire length, thus maintaining the handlebar 26 in an on position.

Figure 5:
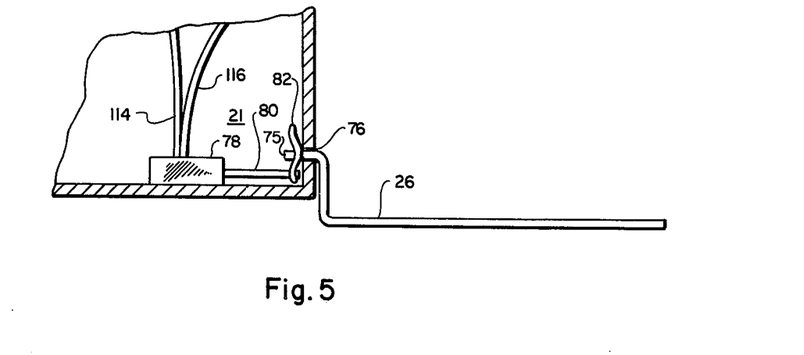
FIG. 5 is an enlarged view of a portion of the cross-sectional view shown in FIG. 2, particularly illustrating the mechanism for triggering the motor which drives the conveyor of the automated cooker.

As shown in FIG. 5, the end 75 of handlebar 26 projects through an opening 76 into the cabinet 21. Wing nut 82 is mounted on the end 75 so that it may engage the spring-biased lever 80 of switch 78. Thus, when the handle portion of a sandwich holder engages handlebar 26, handlebar 26 will rotate, causing wing nut 82 to activate the lever 80 of switch 78, which in turn will turn on the motor 68 and heating elements 52 and 54.

With further reference to FIGS. 2-4, handlebar 26 has a notch 84 that is aligned with the bars 70 and 72 of rack 28. As each sandwich holder advances along screw conveyor 64 and reaches notch 84, the center of gravity of the sandwich holder causes it to drop off the handlebar 26 into notch 84, as illustrated by the broken line drawing in FIG. 4. As the sandwich holder drops into notch 84, it rocks forward, falling off the screw conveyor 64 and into the rack 28, where it is stacked in the cup-shaped basket 75. When the last sandwich holder, as for example sandwich holder 24a drops into rack 28, the spring-biased lever arm 80 (see FIG. 5) of switch 78 will return handlebar 26 to its original position and will thus turn off the motor 68 and the heating elements 52 and 54.

Thus, it will be appreciated that handlebar 26 will be activated along its entire length by any sandwich holder that is placed on the screw conveyor 64 and will be de-activated when the last sandwich holder drops into rack 28.

With further reference to FIGS. 2 and 3, it will be seen that screw conveyor 64 and handlebar 26 are somewhat longer in their length that the length of heating elements 52 and 54. Thus, as illustrated by sandwich holder 24a, a sandwich holder will have to traverse the distance designated "a" before it begins to enter the passage between the heating elements 52 and 54. The additional time to traverse the distance "a" permits heating elements 52 and 54 to be preheated. Alternatively, if heating elements 52 and 54 have already been preheated, the sandwich holder may be attached to the screw conveyor 64 directly at the point of entry into the passage between heating elements 52 and 54.

A thermocouple switch 86 is attached at the top and near the center of heating elements 52 and 54. Thermocouple switch 86 permits the temperature of heating elements 52 and 54 to be adjusted to any desired level.

FIG. 6 illustrates the controls contained within cabinet 21 located at the end of the automated cooker 10. The controls may readily be accessed, as noted above, through the door 14 provided at the end of housing 12.

As shown in FIG. 6, the gas used by the burners enters by pipe 20 which is attached through fittings 87-89 to a solenoid valve 90. Solenoid valve 90 is used to control the flow of gas through the main gas line 56 (see FIG. 2) to the heating elements 52 and 54. Solenoid valve 90 is also used to control the flow of gas through line 92 to thermocouple pilot switch 94 and through line 62 to the pilot lights 58 and 60 (see FIG. 2).

Thermocouple pilot switch 94 is attached to thermocouples 96 and 98 (see FIG. 2) located near pilot lights 58 and 60. Thermocouples 96 and 98 sense whether either of the pilot lights 58 and 60 are extinguished. If one of the pilot lights 58 or 60 is extinguished, thermocouple pilot switch 94 automatically opens the electrical circuit to the solenoid valve 90, thereby shutting off the further flow of gas to the heating elements 52 and 54. Thus, the danger of explosion is eliminated. Moreover, thermocouple pilot switch 94 is also connected through wire 100 which is carried through conduit 102 (see also FIG. 2) to thermocouple switch 86 for purposes of providing temperature control for the heating elements 52 and 54.

With continued reference to FIG. 6, cabinet 21 also contains the electrical controls for the automated cooker 10. As previously indicated, electrical power is supplied through cord 18 which may be plugged into a conventional 120 volt AC outlet. Cord 18 is connected to a terminal block 104. From terminal block 104 power is supplied to motor 68 through wires 106 and 108. Wires 110 and 112 control the directional rotation of the shaft of motor 68. Wires 114 and 116 connect the switch 78 to terminal block 104 and hand-operated switch 188. Switch 118 and switch 30 may be used to manually turn the motor 68 off. To turn motor 68 on the switches 30 and 118 must be in the on position, and handlebar 26 must be depressed as described above.

Wires 120-123 connect the electrical controls to the switch 30 that is placed on the exterior of housing 12. Wire 124 connects the solenoid valve 90 to terminal block 104 and wire 126 connects solenoid valve 90 to switch 118. As with motor 68, solenoid valve 90 may be closed manually with switches 30 and 118, but switches 30 and 118 must be in the on position and handlebar 26 must be depressed before solenoid valve 90 will open.

Wires 128 and 130 are connected to a 120 volt AC variable transformer 132. Dial 134 may be used to adjust transformer 132 so as to vary the speed of motor 68. Thus, variable transformer 132 enables the screw conveyor 64 to be driven (i.e. rotated) at any selected speed, thereby speeding up or slowing down the rate at which the sandwich holders 22-24 are transported through the heating elements 52 and 54.

From the foregoing description of the automated sandwich cooker 10, the manner of its use will be readily apparent to those of ordinary skill in the art. For example, sandwiches are first prepared and placed between plates 34 and 36 (see FIG. 7) of the individual sandwich holders 22-24. The sandwich holders 22-24 are closed so that the sandwich is clamped between plates 34 and 36 and handles 46 and 48 are then locked together by clip 44.

Switches 30 and 118 are turned on and one or more sandwich holders 24a-24c (see FIGS. 1-3) are each attached to screw conveyor 64 by means of the hook 50a-50c provided on the sandwich holders. If the heating elements 52 and 54 need to be preheated, the first sandwich holder is attached to the screw conveyor 64 such that it will traverse the distance "a" (see FIG. 2) before it begins to enter the passage between heating elements 52 and 54. If heating elements 52 and 54 are already heated, the sandwich holders may be attached to screw conveyor 64 at the entrance of the heating elements 52 and 54. The temperature of heating elements 52 and 54 may be adjusted at thermocouple switch 86.

Upon attaching one or more sandwich holders 24a-24c to the screw conveyor 64, handlebar 26 is engaged by the handle portion of each sandwich holder, thereby activating the lever arm 80 (see FIG. 5) of switch 78. Motor 68 is thereby turned on so as to rotate screw conveyor 64, and heating elements 52 and 54 are also activated. The speed of rotation for screw conveyor 64 may be adjusted at the dial 134 (see FIG. 6) of variable transformer 132.

As screw conveyor 64 transports the sandwich holders 24a-24c through the passage provided between heating elements 52 and 54, plates 34 and 36 will be heated so as to cook each sandwich contained therein. As the sandwich holders reach the end of the heating elements 52 and 54, they are transported to rack 28 and the handle portion of each sandwich holder drops into notch 84 (see FIG. 3) provided at the end of handlebar 26. When the handle portion of each sandwich holder drops into notch 84, the weight of the handle portion will cause the sandwich holder to rock forward (see FIG. 4) so that it will fall off of the screw conveyor 64 and into the rack 28 formed by bars 70 and 72. In this manner, each sandwich holder is removed from the screw conveyor 64 and automatically stacked in sequence in rack 28. When the last such sandwich holder falls into rack 28, handlebar 26 will be returned to its forward position by the spring action of lever arm 80 on switch 78, thereby turning off motor 68 and heating elements 52 and 54. As the individual sandwich holders 24a-24c emerge from the heating elements 52 and 54, rack 28 will catch the sandwich holders and stack them.

Although the automated sandwich cooker 10 has been illustrated and described in connection with its use for cooking hamburgers, sandwiches or the like, it will of course be appreciated by those of ordinary skill in the art that the cooker 10 may be used in a wide variety of applications. For example, the sandwich cooker 10 may be used in cooking dessert items such as turnovers or filled pastries. Moreover, as shown in FIG. 8, a second preferred embodiment of the automated sandwich cooker generally designated 10' may be used for purposes of cooking pancakes, waffles or other types of foods which must be grilled on a horizontal surface.

Figure 8:
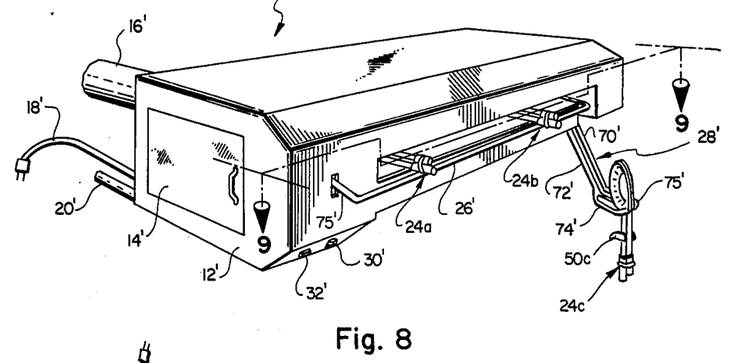
FIG. 8 is a perspective illustration of a second embodiment of the automated cooker of the present invention.
Figure 9:
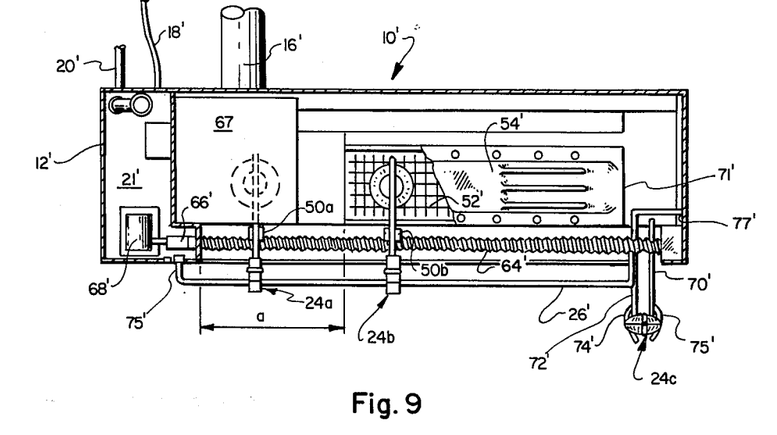
FIG. 9 is a cross section taken along line 9—9 of FIG. 8.
Figure 10:
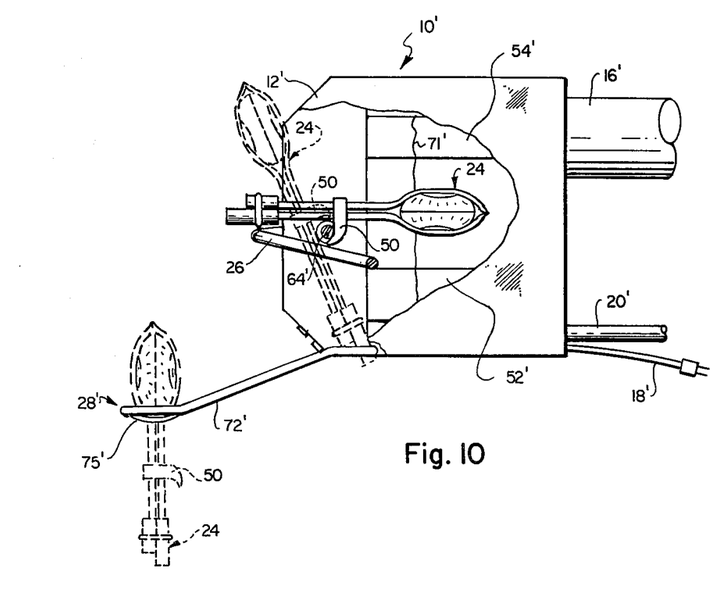
FIG. 10 is a side elevational view of the embodiment of FIG. 8, with portions broken away to reveal interior construction.

As shown in FIG. 8, the handlebar 26' is oriented so as to support the handles of the sandwich holders 24a-24c in a generally horizontal position. The heating elements 52' and 54' (see FIG. 9) are likewise horizontally oriented so that the individual holders 24a-24c will pass through the heating elements in a horizontal fashion. Handlebar 26' is pivotally mounted at ends 75' and 77' (see FIG. 9) to the walls of housing 12'. As shown in FIG. 9, handlebar 26' terminates at the bar 72' of rack 28'. Thus, as each sandwich holder comes to the end of handlebar 26', the handle portion will fall off the end of handlebar 26' and will be caught between bars 70' and 72' of rack 28'. As illustrated in FIG. 10 by the broken line illustration of sandwich holder 24, as the handle portion falls off the handlebar 26', the sandwich holder 24 rocks forward so that the hook 50 falls off the screw conveyor 64', thus permitting the sandwich holder 24 to be caught and stacked by rack 28'.

As further shown in FIGS. 9 and 10, screw conveyor 64' and handlebar 26' are located above the bars 72' and 74' of rack 28' so as not to impede the movement of sandwich holders 24a-24c along screw conveyor 64'. The remaining elements of the embodiment illustrated in FIGS. 8-10 are essentially the same in their structure and operation as the correspondingly numbered elements previously described in connection with FIGS. 1-6.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An automated cooker for sandwiches and the like, said cooker comprising:
   heating means for cooking said sandwiches as they pass therethrough;
   one or more sandwich holders for individually carrying each sandwich, each holder comprising handle means and means for enclosing the sandwich to be cooked;
   conveyor means for transporting said sandwich holders through said heating means;
   a motor for driving said conveyor means;
   a switch for turning on said motor; and
   means for triggering said switch, said triggering means being placed such that it will be activated by the handle means of any sandwich holder attached to said conveyor means.

2. An automated cooker as defined in claim 1 wherein said heating means comprise:
   a pair of heating elements spaced one from the other so as to permit said holders to pass therethrough; and
   temperature control means for adjusting the temperature of said heating elements.

3. An automated cooker as defined in claim 2 wherein said heating elements comprise gas burners.

4. An automated cooker as defined in claim 1 wherein said conveyor means comprise:
   an electric motor; and
   a screw attached to the shaft of said motor, said screw rotating whenever said motor is turned on.

5. An automated cooker as defined in claim 4 wherein the length of said screw exceeds the length of said heating means so as to permit said heating means to reach a desired temperature before said holders are transported by said screw through said heating means.

6. An automated cooker as defined in claim 1 wherein said heating means comprise electrical heating elements.

7. An automated cooker as defined in claim 1 further comprising means for adjusting the speed at which said conveyor means transport said sandwich holders through said heating means.

8. An automated cooker as defined in claim 1 further comprising:
   means for catching and stacking said sandwich holders as they emerge from said heating means; and
   means for automatically stopping said conveyor means after the last sandwich holder has emerged from said heating means.

9. An automated cooker for sandwiches and the like, said cooker comprising:
   heating means for cooking said sandwiches as they pass therethrough;
   one or more sandwich holders for individually carrying each said sandwich, each holder comprising handle means and means for enclosing the sandwich to be cooked;
   conveyor means for transporting said sandwich holders through the passage between said heating elements;
   a motor for driving said conveyor means;
   a switch for turning on said motor; and
   a bar for triggering said switch, said bar being placed such that it will be activated by the handle means of any sandwich holder attached to said conveyor means.

10. An automated sandwich cooker as defined in claim 9 further comprising a rack for catching and stacking each sandwich holder as it emerges from the passage between said heating elements.

11. An automated sandwich cooker as defined in claim 9 wherein one of the ends of said bar is formed to provide a notch, said bar becoming de-activated when the handle means of the last holder reaches said notch.

12. An automated sandwich cooker as defined in claim 9 wherein said conveyor means comprise a screw, the length of said screw and the length of said bar exceeding the length of said passage so as to permit the heating elements to reach a desired temperature level before the sandwich holders are transported by the screw through said passage.

13. An automated sandwich cooker as defined in claim 9 wherein said heating elements comprise a pair of gas burners with a pilot light for each burner.

14. An automated sandwich cooker as defined in claim 13 further comprising:
- a valve for controlling the flow of fuel to said burners;
- a thermocouple associated with one of said pilot lights; and
- a thermocouple pilot switch for automatically closing said valve whenever the thermocouple senses that said pilot light has been extinguished.

15. An automated sandwich cooker as defined in claim 9 further comprising means for adjusting the temperature of said heating elements to one or more desired levels.

16. An automated sandwich cooker as defined in claim 9 further comprising a variable transformer for controlling the speed of said motor.

17. An automated sandwich cooker as defined in claim 9 wherein each said sandwich holder further comprises means for attaching the holder to said conveyor means.

18. An automated sandwich cooker as defined in claim 9 wherein the sandwich enclosing means of each said sandwich holder comprise:
- two plates adapted to be clamped together so as to enclose therebetween a sandwich; and
- means for locking said plates in the clamped position.

19. An automated sandwich cooker as defined in claim 18 wherein each said plate is constructed as a wire mesh screen.

20. An automated cooker for sandwiches and the like, said cooker comprising:
- a pair of gas burners spaced one from the other to form a passage therebetween, each burner having associated therewith a pilot light;
- one or more sandwich holders for individually carrying each said sandwich, each holder comprising handle means, means for enclosing the sandwich to be cooked and means for attaching the holder to a screw conveyor;
- a screw conveyor for transporting said sandwich holders through the passage between said burners;
- a motor for driving said screw conveyor;
- a switch for turning on said motor;
- a bar for triggering said switch, said bar extending along the length of said burners so as to be activated along its entire length by the handle means of any sandwich holder as said holder is transported through the passage between said burners, said bar having at one of the ends thereof a notch so that the bar will be de-activated when the handle means of the last sandwich holder reaches said notch;
- a rack for catching and stacking each sandwich holder as it emerges from the passage between said burners;
- a valve for controlling the flow of fuel to said burners;
- a thermocouple associated with at least one of said pilot lights;
- a thermocouple pilot switch for automatically closing said valve whenever the thermocouple senses that said pilot light has been extinguished;
- means for controlling the speed of said motor; and
- means for adjusting the temperature of said burners.

* * * * *